(12) United States Patent
Nishie et al.

(10) Patent No.: US 9,128,258 B2
(45) Date of Patent: Sep. 8, 2015

(54) OPTICAL ASSEMBLY AND METHOD FOR PRODUCING THE SAME

(75) Inventors: Mitsuaki Nishie, Yokohama (JP); Michio Murata, Yokohama (JP); Reiko Murata, legal representative, Yokohama (JP); Hiromi Nakanishi, Yokohama (JP)

(73) Assignee: Sumitomo Electric Industries, Ltd., Osaka-shi (JP)

( * ) Notice: Subject to any disclaimer, the term of this patent is extended or adjusted under 35 U.S.C. 154(b) by 113 days.

(21) Appl. No.: 14/002,323

(22) PCT Filed: Apr. 27, 2012

(86) PCT No.: PCT/JP2012/061789
§ 371 (c)(1),
(2), (4) Date: Aug. 29, 2013

(87) PCT Pub. No.: WO2012/153745
PCT Pub. Date: Nov. 15, 2012

(65) Prior Publication Data
US 2014/0219607 A1    Aug. 7, 2014

(30) Foreign Application Priority Data

May 10, 2011  (JP) .................................. 2011-105526
May 10, 2011  (JP) .................................. 2011-105527

(51) Int. Cl.
*G02B 6/42*    (2006.01)
(52) U.S. Cl.
CPC .............. *G02B 6/42* (2013.01); *G02B 6/4204* (2013.01); *G02B 6/4224* (2013.01); *Y10T 29/49895* (2015.01)

(58) Field of Classification Search
None
See application file for complete search history.

(56) References Cited

U.S. PATENT DOCUMENTS

| | | | |
|---|---|---|---|
| 4,616,899 A | 10/1986 | Schlafer | |
| 5,215,489 A * | 6/1993 | Nakamura | 445/4 |
| 6,040,934 A | 3/2000 | Ogusu et al. | |
| 6,942,398 B2 * | 9/2005 | Morioka | 385/93 |
| 7,156,563 B2 * | 1/2007 | Morioka | 385/93 |
| 2004/0022487 A1 | 2/2004 | Nagasaka et al. | |
| 2008/0088929 A1 * | 4/2008 | Morioka et al. | 359/566 |
| 2013/0336620 A1 * | 12/2013 | Tateishi et al. | 385/93 |
| 2014/0133801 A1 * | 5/2014 | Kanke et al. | 385/33 |

FOREIGN PATENT DOCUMENTS

| | | | |
|---|---|---|---|
| CN | 1916603 A | | 2/2007 |
| JP | 3-240007 A | * | 10/1991 |
| JP | 4-53912 A | * | 2/1992 |

(Continued)

OTHER PUBLICATIONS

International Search Report and Written Opinion in PCT International Application No. PCT/JP2012/061789, mailed Aug. 9, 2012.

(Continued)

*Primary Examiner* — Mike Stahl
(74) *Attorney, Agent, or Firm* — Venable LLP; Michael A. Sartori; Trent B. Ostler

(57) ABSTRACT

An optical assembly is disclosed where the optical assembly provides an optical device and a holder including a sleeve, a skirt, and a lens. The sleeve has a bore, into which an external optical fiber is set to couple with the optical device, providing a target surface in an end thereof. The target surface includes an aiming index to indicate the axis of the lens.

15 Claims, 15 Drawing Sheets

(56) References Cited

FOREIGN PATENT DOCUMENTS

| | | | |
|---|---|---|---|
| JP | 0560951 A | | 3/1993 |
| JP | H10-10373 A | | 1/1998 |
| JP | 2001-174672 A | | 6/2001 |
| JP | 2003-344298 A | | 12/2003 |
| JP | 2004-086136 A | | 3/2004 |
| JP | 2004-207344 A | | 7/2004 |
| JP | 2004-354452 A | | 12/2004 |
| JP | 2006-227478 A | * | 8/2006 |
| JP | 2007-011064 A | | 1/2007 |
| JP | 2007-155973 A | | 6/2007 |
| JP | 2008-176342 A | | 7/2008 |
| JP | 2009-133962 A | | 6/2009 |
| JP | 2010-107692 A | | 5/2010 |

OTHER PUBLICATIONS

Notification of the First Office Action in Chinese Patent Application No. 201280022060.2, dated Nov. 2, 2014.

Notice of Reasons for Rejection in Japanese Patent Application No. 2011-105527, dated Mar. 17, 2015.

Notice of Reasons for Rejection issued in Japanese Patent Application No. 2011-105526 dated Mar. 24, 2015.

* cited by examiner

OPTICAL ASSEMBLY AND METHOD FOR PRODUCING THE SAME

TECHNICAL FIELD

An embodiment of the present invention relates to an optical assembly, in particular, relates to an optical assembly including an optical device and a holder integrating a receptacle, a skirt and a lens. An embodiment of the invention further relates to a method to produce the optical assembly.

BACKGROUND ART

A recent communicating system has continuously requested the higher speed and the greater capacity. An optical assembly that includes a semiconductor optical device, such as a laser diode (LD) for emitting light or a photodiode (PD) for receiving light, and a mechanism to couple the semiconductor optical device with an external optical fiber is widely applied in the optical communication system. The optical device often has, what is called, a CAN package, while, the coupling mechanism includes a sleeve to receive the external optical fiber, a skirt to receive the CAN package and a lens integrally formed with the sleeve and the skirt.

A Japanese Patent Application published as JP-2010-107692A has disclosed an optical assembly having the optical device and the coupling mechanism. FIG. 15 schematically illustrates, in a cross section thereof, the optical assembly disclosed in the prior art above. The optical assembly 100 includes a holder 110 and an optical device 102 that installs a semiconductor optical device 103 therein. The holder 110 includes a sleeve 112, a lens 113, and a skirt 114. Another Japanese Patent Application published as JP-2007-155973A has disclosed a method to produce an optical assembly, where the semiconductor optical device practically emits light in a process to align the holder with the optical device. Sliding the semiconductor optical device in a plane perpendicular to the optical axis of the device and monitoring the light provided from a tip end of the optical fiber, the optical device is assembled with the holder at a center of the symmetrical distribution of the field pattern of the light.

In order to obtain a desired coupling efficiency between the optical device and the external optical fiber for the optical assembly disclosed in the former prior art, the semiconductor device 103 is preferably positioned on the focal point of the lens 113. Specifically, the semiconductor device 103 is necessary to be positioned around the focal point of the lens 113 within about 10 µm in a case where the external optical fiber is, what is called, a multi-mode fiber. However, the installation of the optical device 103 within the optical device 102 inherently shows alignment tolerance comparable to or greater than the limitation above.

The method to produce the optical assembly disclosed in the latter prior art is not only necessary to activate the semiconductor device practically and to prepare an apparatus to monitor the amplitude of the light, but the method takes a long time to determine the optimal position. Embodiments of the present invention are to provide an improved arrangement of the holder and a method to produce the optical assembly.

SUMMARY OF INVENTION

One aspect of the present invention relates to an optical assembly that couples with an external optical fiber. The optical assembly may comprise an optical device and a holder. The optical device may install a semiconductor optical device therein; while, the holder may include a sleeve with a first bore to receive the external optical fiber, a skirt to be fixed to the optical device, and a lens put between the sleeve and the skirt. A feature of the optical assembly according to an embodiment of the invention is that the first bore of the sleeve may provide a target surface in an end thereof that includes an aiming index to indicate an axis of the lens.

The first bore may further provide a step between the target surface and an opening through which the external optical fiber is inserted, the step abutting against a ferrule that secures a tip end of the external optical fiber. The sleeve may further include a second bore with a diameter smaller than that of the first bore to form the step between the first and second bores. The step may provide a function of the aiming index to indicate the center of the axis.

When the semiconductor optical device is a light-emitting device and has an active area from which light is emitted, the lens may generate a focused image of the active area on a virtual plane including the target surface for a wavelength of the light emitted from the semiconductor optical device, and a center of the focused image of the active area may be aligned with the center of the lens. On the other hand, when the semiconductor optical device is a light-receiving device and has an active area to which the light provided from the external optical fiber enters, the lens may generate a focused image of the active area on a virtual plane including the target surface for a wavelength of the light provided from the external optical fiber, and a center of the focused image of the active area may be aligned with the center of the lens. Alternatively, the lens may generate a focused image of the active area of the semiconductor optical device on a virtual plane for light attributed to the optical device, where the virtual plane may be offset from the target surface along the axis of the lens. In still another embodiment of the invention, the lens may generate a focused image of the active area of the semiconductor optical device on a virtual plane including the step for light attributed to the semiconductor optical device.

The target surface may provide at least two aiming indices each having a reference edge to indicate the axis of the lens, where each of the reference edges is located between an inner contour of the image of the active area focused on the target surface by the lens and an outer contour of a virtual image four times broader than the image of the active area focused on the virtual plane.

Another aspect of the present invention relates to a process to manufacture an optical assembly that includes an optical device installing a semiconductor optical device with an active area and a holder having a sleeve to receive the external optical fiber, a skirt to receive the optical device, and a lens put between the sleeve and the skirt, where the sleeve, the skirt, and the lens may be integrally formed with each other. The process of an embodiment may comprise steps of: (a) aligning the optical device in a plane perpendicular to an axis of the lens as inspecting an image of the active area of the semiconductor optical device which is projected on a target surface formed in a deep end of the sleeve; and (b) fixing the optical device with the skirt of the holder. A feature of the process according to an embodiment is that the target surface may include at least two aiming indices to indicate the axis of the lens. Aligning the center of the image focused on the target surface with the axis of lens, the optical alignment between the optical device and the holder in a plane perpendicular to the axis of the lens may be precisely and easily preformed.

BRIEF DESCRIPTION OF DRAWINGS

Non-limiting and non-exhaustive embodiments of the present invention will be described with reference to the following figures, wherein like reference numerals refer to like parts throughout the various figures unless otherwise specified.

DESCRIPTION OF EMBODIMENTS

Next, some preferred embodiments according to the present invention will be described as referring to drawings. In the description of the drawings, the same numerals or symbols will refer to the same or like elements without overlapping explanations.

Figure 1:
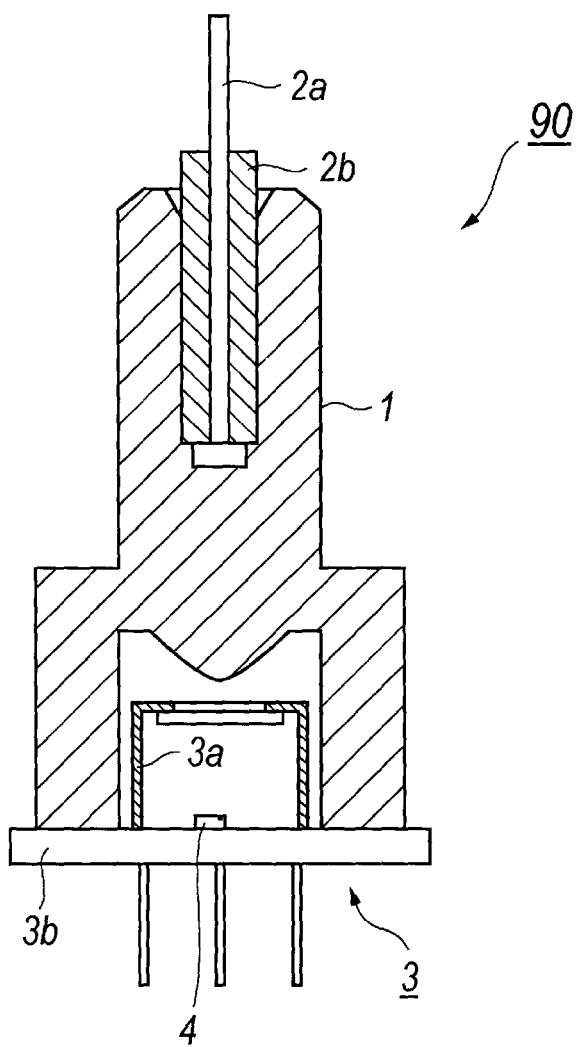
FIG. 1 shows a cross section of an optical assembly according to an embodiment of the invention.

FIG. 1 shows a cross section of an optical assembly 90 implementing with a holder 1. The optical assembly 90 includes an optical device 3 that installs a semiconductor optical device 4 therein. The optical device 3 includes a cap 3a and a base 3b for mounting the semiconductor optical device 4 thereon. The holder 1 receives in an end thereof an external optical fiber 2a with a ferrule 2b for securing a tip end of the optical fiber. The holder 1 may couple the semiconductor device 4 optically with the external optical fiber 2a. The external optical fiber 2a may be, what is called, a multi-mode fiber.

Figure 2:
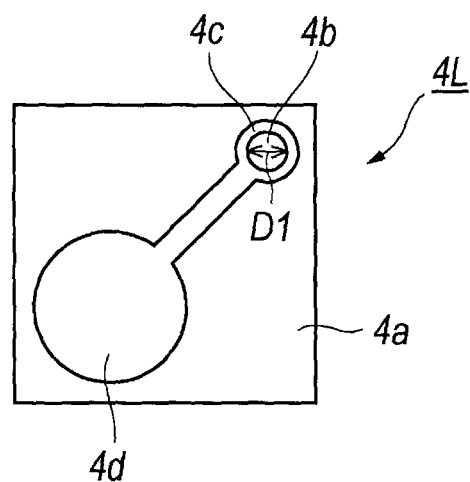
FIG. 2 is a plan view of a semiconductor optical device installed in the optical assembly shown in FIG. 1.

The semiconductor optical device 4 may be, for instance, a laser diode (LD), or a photodiode (PD). The embodiment shown in the figures installs an LD 4L generally called as the vertical cavity surface emitting laser diode (VCSEL) that emits light with a wavelength of, for instance, 850 nm. FIG. 2 is a plan view of the VCSEL 4L. The VCSEL 4L provides an active area 4b in a corner of the primary surface 4a thereof, from which the light is emitted. The active area 4b is surrounded by the electrodes 4c with a ringed shape to distinguish the active area 4b easily. The electrode 4c extends a pad 4d in another corner of the primary surface to which an conductive wire is bonded. When a PD is installed as the semiconductor optical device 4, the PD may provide a light-receiving area as the active area to receive light provided from the external optical fiber 2a. When an edge-emitting LD, which emits light from an edge, or an end facet thereof, is installed in the optical device as the semiconductor optical device 4, the active area thereof, which exists in the end facet, may be distinguishable by forming projections in the end facet.

Figure 3:
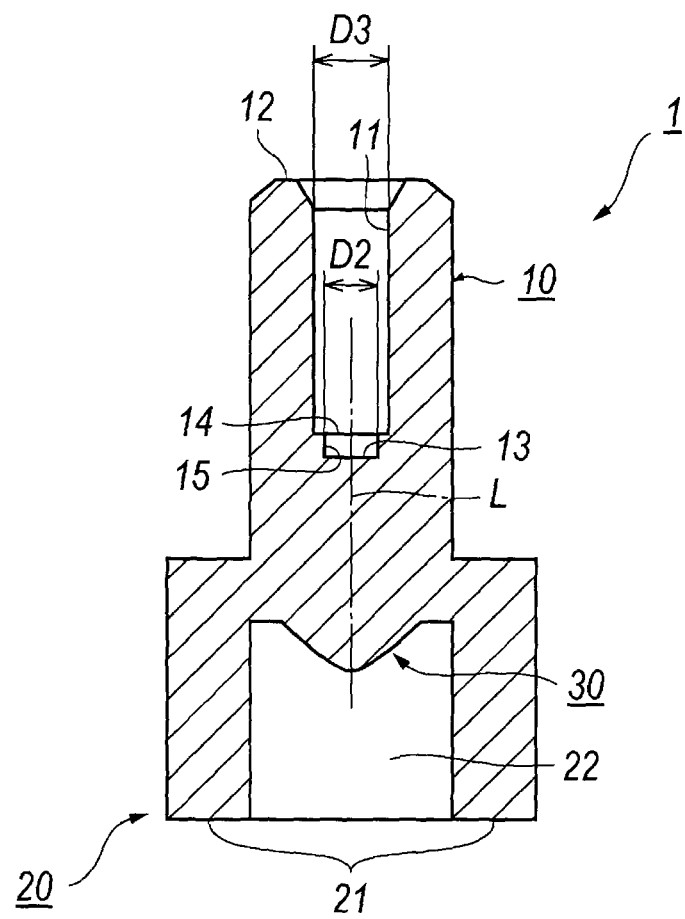
FIG. 3 shows a cross section of a holder according to an embodiment of the invention.

The holder 1 according to an embodiment will be described as referring to FIG. 3. FIG. 3 shows a cross section of the holder 1, which includes a sleeve 10, a skirt 20, and a lens 30. The lens 30, which has an optical axis L, is monolithically and integrally formed with the sleeve 10 and the skirt 20. The axis L coincides with the center of a bore 11 in the sleeve 10. The holder 10 thus formed may be made of optically transparent resin such as polyetherimide (PEI), polycarbonate (PC), polymethyl methacrylate (PMMA), and so on. The injection molding of such a resin may form the holder 1.

The skirt 20 receives the optical device 3 as shown in FIG. 1. That is, the skirt 20 includes a bottom 21 and a bore 22. The bore 22 may receive the cap 3a, while, the bottom 21 abuts against a periphery of the base 3b of the optical device 3. Fixing the bottom 21 with the base 3b, the optical device 3 may be assembled with the holder 1.

The sleeve 10 includes the bore 11, a target surface 13, and a step 14. The bore 11, which extends along the axis L, provides an opening 12 in an end thereof to receive the ferrule 2b securing the end of the external optical fiber 2a. The target surface 13 and the step 14 make substantially a right angle with respect to the axis L and are located in a deep end of the bore. The target surface 13 provides an aiming index to indicate the position of the axis L. Details of the aiming index will be described later. The step 14, which is located between the opening 12 of the bore 11 and the target surface 13, accompanies therewith the second bore 15 whose diameter D2 is greater than a diameter of the external optical fiber 2a, which is typically 125 μm, but less than a diameter of the first bore 11. The diameter of the second bore is preferably about 600 μm in the present embodiment. The diameter of the target surface 13 is substantially equal to the diameter D2 of the second bore. While, the diameter D3 of the step 14 is substantially equal to the diameter of the first bore 11, which is slightly greater than a diameter of the ferrule 2b and also greater than the diameter D2 of the second bore 15 to form the step therebetween.

Figure 4A:
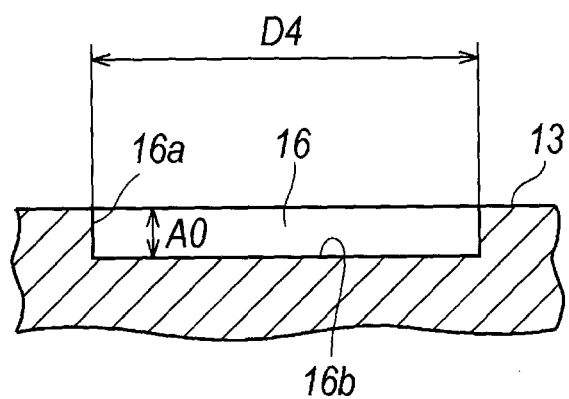
FIG. 4A shows cross section of an example of an aiming index.
Figure 4B:
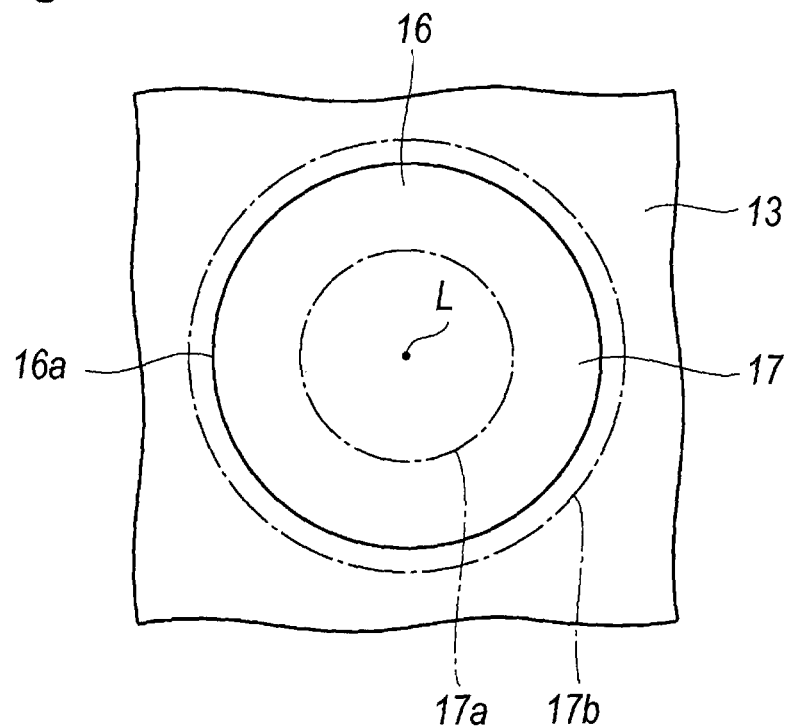
FIG. 4B is a plan view showing a relation between the aiming index and an image focused on the target surface.

Details of the aiming index 16 formed on the target surface 13 will be described. FIG. 4A shows a cross section, while, FIG. 4B is a plan view of the aiming index 16 in the target surface 13. The aiming index 16 indicates the position of the axis L of the lens 30 to align the VCSEL 4L with respect to the axis L. Specifically, viewing the deep end of the bore 11 from the opening 12 of the sleeve 10, and bringing the center of the active area 4b of the VCSEL 4L, an image of which is focused or projected on the target surface 13, close to the axis L indicated by the aiming index 16; the VCSEL 4L may be aligned with the axis L. The size of the image of the active area 4b projected on the target surface 13 substantially becomes a diameter D1 of the active area 4b multiplied by the magnification power of the lens 30.

The aiming index 16 may be, for instance, a circular hollow or terrace with a diameter of 10 to 30 μm, or a cross-shaped mark. FIG. 4 shows the aiming index 16 with the circular hollow formed in the target surface 13, where the hollow has a diameter D4 of about 20 μm and a depth A0 of about 10 μm from the top of the target surface 16 to the bottom 16b thereof. The target surface 13 has an aiming area 17 put between two contours, 17a and 17b. The inner contour 17a, which has the center aligned with the axis L of the lens 30, is a silhouette of the active area 4b projected on the target surface 13; while, the outer contour 17b, the center of which is also aligned with the axis L of the lens, has an area four times broader than an area of the active area of the VCSEL 4L, namely, the outer contour 17b has a diameter twice larger than the diameter of the active area 4b. The aiming area 17 covers the reference edge 16a of the aiming index 16. The reference edge 16a indicates the outline of the area within which the image of the active area 4b projected on the target surface 13 is fully covered. The embodiment shown in the figure has the reference edge 16a having a circular shape whose center is aligned with the axis L of the lens 30.

The aiming index 16, in particular, the reference edge 16a thereof, is preferably formed outside of the inner contour 17a in order to prevent light emitted from the VCSEL 4L, or the external optical fiber 2a, from scattering. Further, the reference edge 16a is also preferably formed inside the outer contour 17b in order to align the image of the active area 4b precisely with the axis L of the lens 30 on the target surface 13. Moreover, the reference edge 16a preferably has an area of, the diameter D1 of the active area 4b multiplied by the magnification power of the lens 30, that is, the size of the active area 4b projected on the target surface 13 multiplied by one to two. For instance, the area surrounded by the reference edge 16a has a diameter of 10 to 30 μm.

Figure 5:
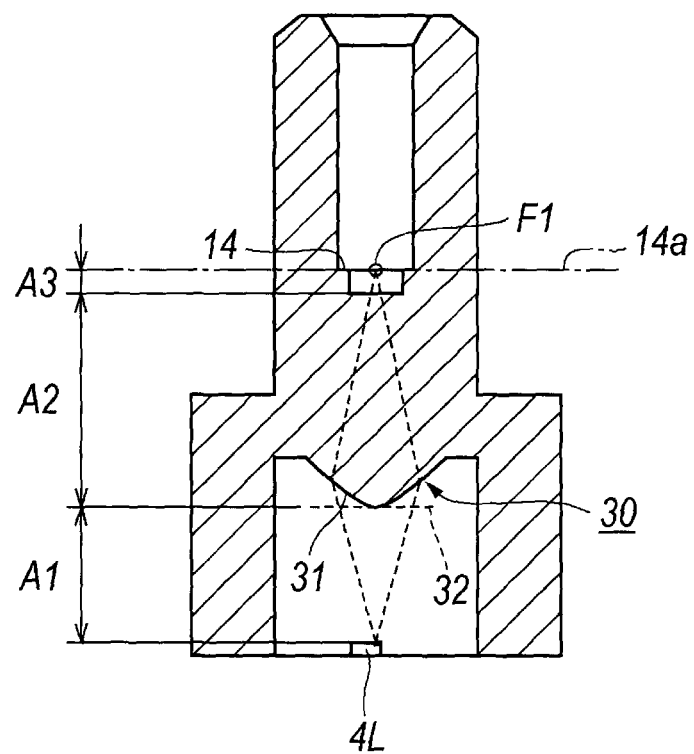
FIG. 5 shows a cross section of the holder including a ray tracing for light with the first wavelength from the semiconductor optical device to a virtual plane including the step in the bore of the sleeve.

Next, the lens 30 will be described in detail as referring to FIGS. 5 and 6. FIG. 5 shows a cross section of the holder 10, in particular, FIG. 5 includes ray traces of light with a preset wavelength, namely, the wavelength of the light generating in the VCSEL 4L and output from the active area 4b thereof. When the semiconductor optical device 4 is a PD, the wavelength above described is the wavelength of the light provided from the external optical fiber 2a and entering the PD. The preset wavelength may be selected from, for instance, 800 nm, 850 nm, 1300 nm, and 1490 nm.

As shown in FIG. 5, the lens 30 has the first focal point F1, or a beam waist, assuming the active area 4b as the object point. The first focal point F1 is within a virtual surface 14a including the step 14 within a range of the depth of focus. Specifically, assuming the active area 4b of the VCSEL 4L as the object point, the first focal point F1, which is the image point, is set on the virtual plane of the step, which is equivalently the end surface of the external optical fiber 2a. The first focal point F1 may shift from the virtual surface 14a along the axis L of the lens 30 to another virtual surface offset from the original one 14a.

Figure 6:
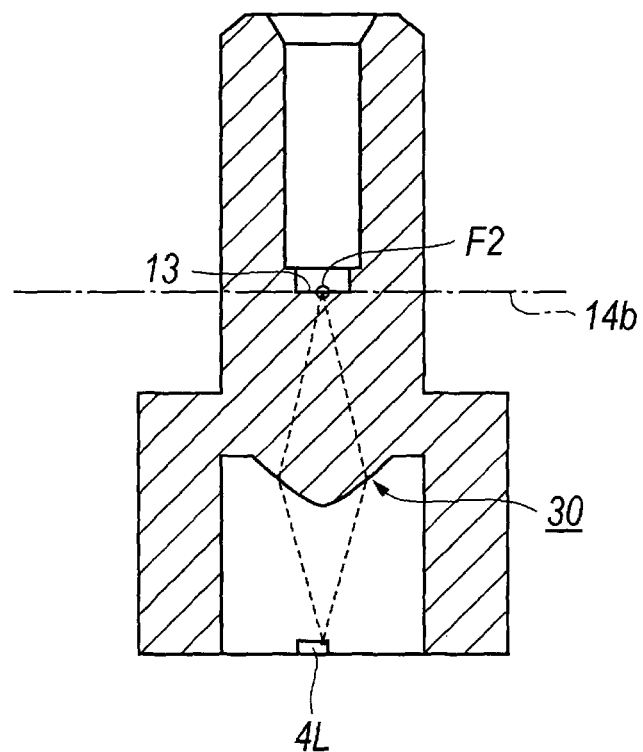
FIG. 6 shows cross section of the holder including another ray tracing for light with the second wavelength shorter than the first wavelength in FIG. 5.

FIG. 6 shows a cross section of the holder 10 with another ray trace of light whose wavelength is shorter than the wavelength of the light shown in FIG. 5. The wavelength, which may be called as the inspecting wavelength, is in the visible range, preferably shorter than 600 nm. The embodiment shown in FIG. 6 uses the wavelength of 555 nm for the inspection. The lens 30 has the second focal point F2, or the position of the beam waist, for the light with the wavelength of 555 nm, which overlaps with the virtual plane 14b including the target surface 13 within the focal depth.

Specific structures of the lens 30 having the focal points, F1 and F2, under the condition where the wavelength of the light from the VCSEL 4L is 850 nm, that for inspection is 550 nm, and the holder 1 is made of PEI, have a curved surface 31 as shown in FIGS. 5 and 6, with a radius of the curvature of, for instance, 0.689 mm around the crown thereof. The PEI constituting the holder 1 has the refractive index of 1.67 at the wavelength of 850 nm; while, the refractive index thereof becomes 1.65 for the wavelength of 550 nm. Although the structure of the lens 30 above described assumes the spherical curvature, the lens 30 preferably has aspheric structures to correct the aberration thereof.

Assuming a virtual plane 32 extending in parallel to the target surface 13 and including the crown of the curved surface 31 of the lens 30, a distance A1 from the active area 4b of the VCSEL 4L to this virtual plane 32 is set to be, for instance, 2.2 mm; a distance from the virtual plane 32 to the target surface 13 is set to be, for instance, 3.146 mm; and a distance A3 from the target surface 13 to the step 14, which is the depth of the second bore 15, is set to be, for instance, 0.137 mm. A transparent resin generally shows smaller refractive index thereof as the wavelength becomes shorter. Accordingly, the depth A3 of the second bore 15 is preferably set to be greater when the wavelength of the inspecting light is set shorter in order to avoid the interference between the inspecting light and the light emitted from the VCSEL 4L.

Figure 7:
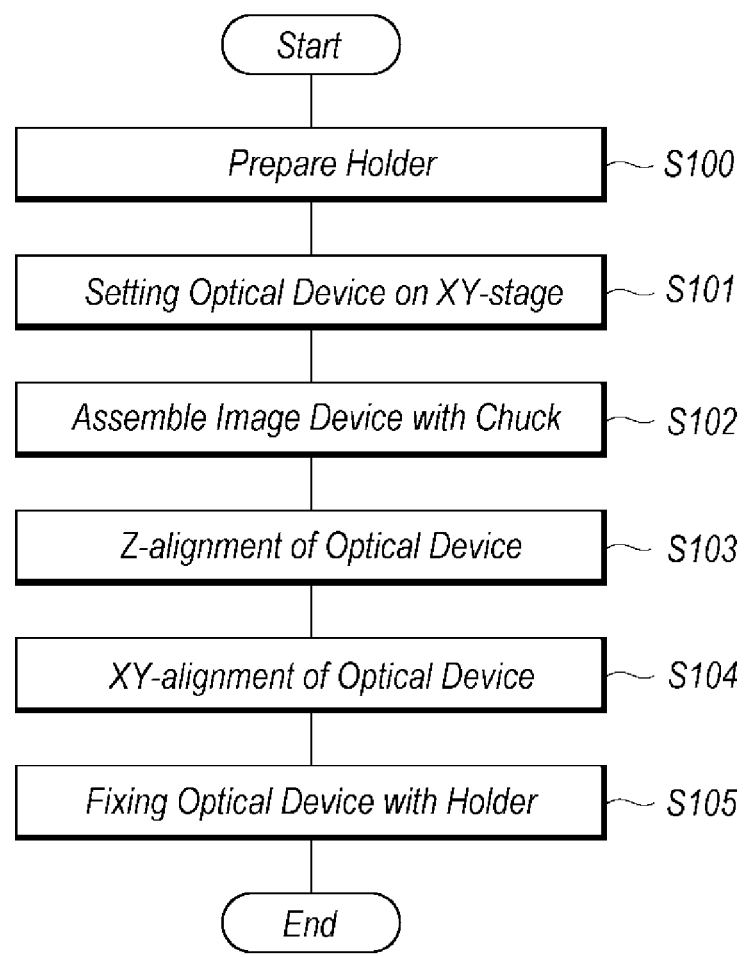
FIG. 7 shows a flow chart to manufacture the optical assembly providing the holder with the aiming index in the target surface.
Figure 8:
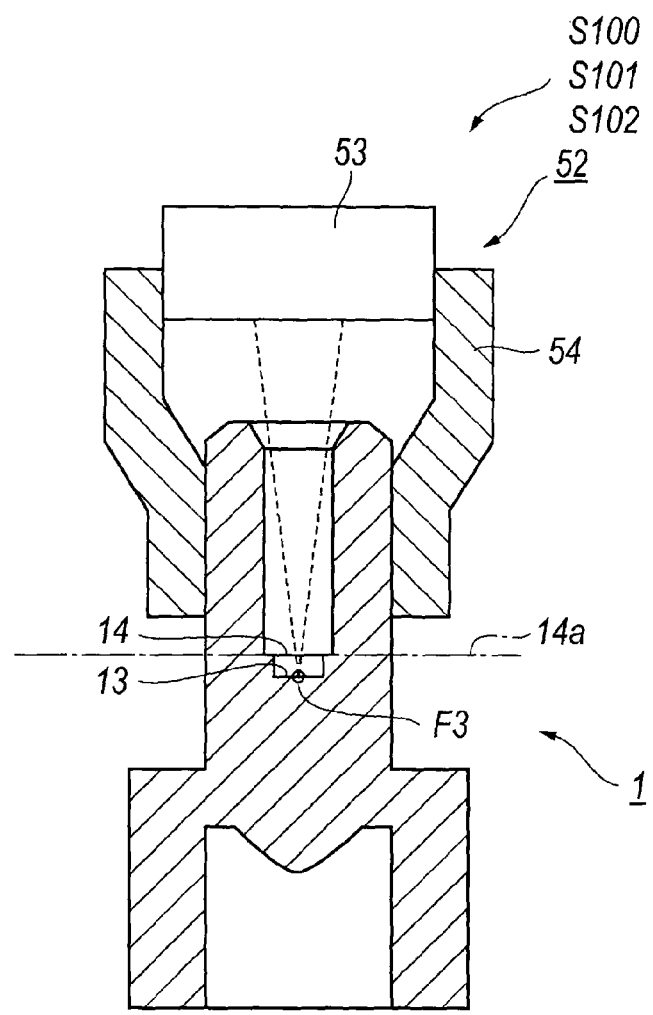
FIG. 8 shows a process to align the optical device with the holder by using an image device inspecting the target surface of the sleeve.
Figure 8:
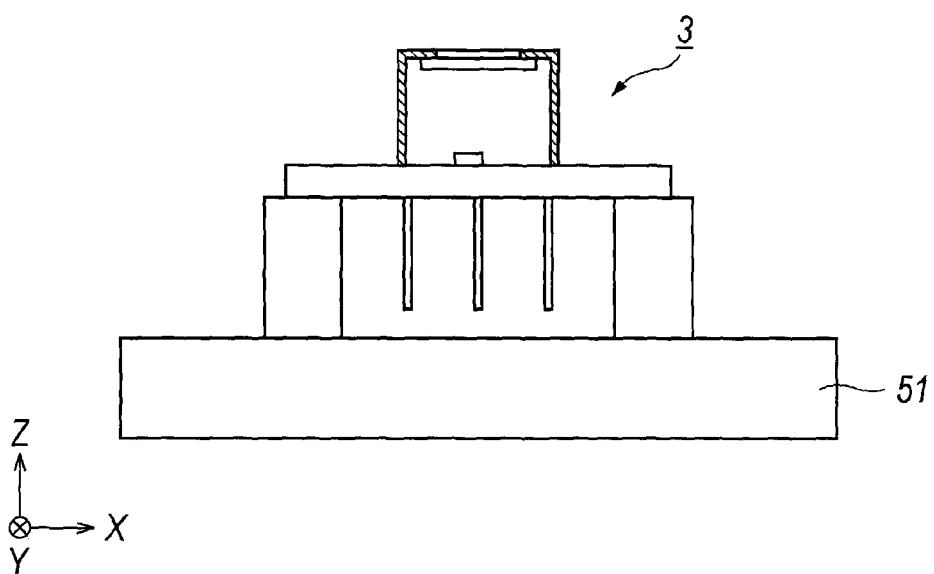
Figure 9:
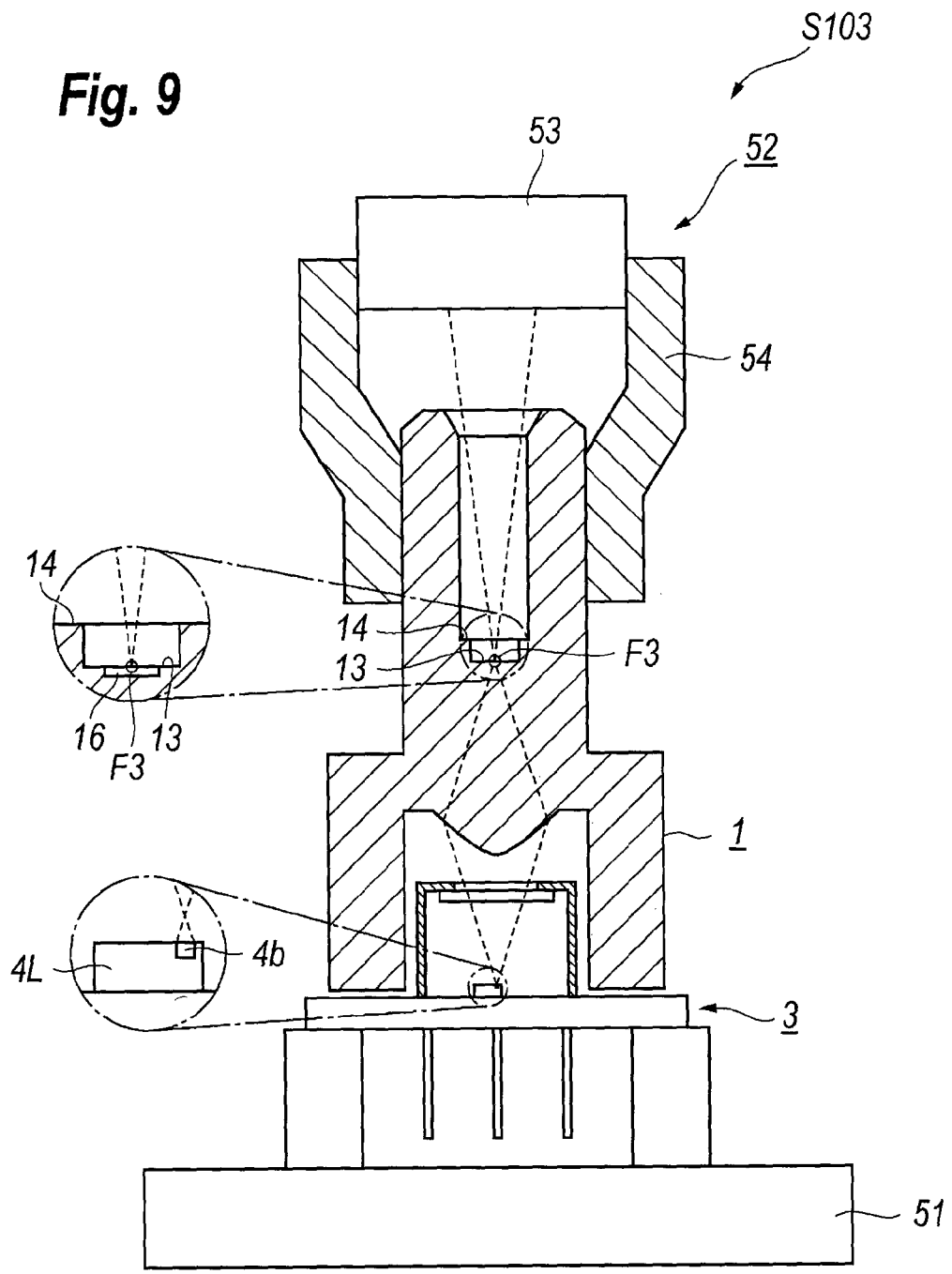
FIG. 9 shows a process, subsequent to the process shown in FIG. 8, to align the optical device with the holder.
Figure 10:
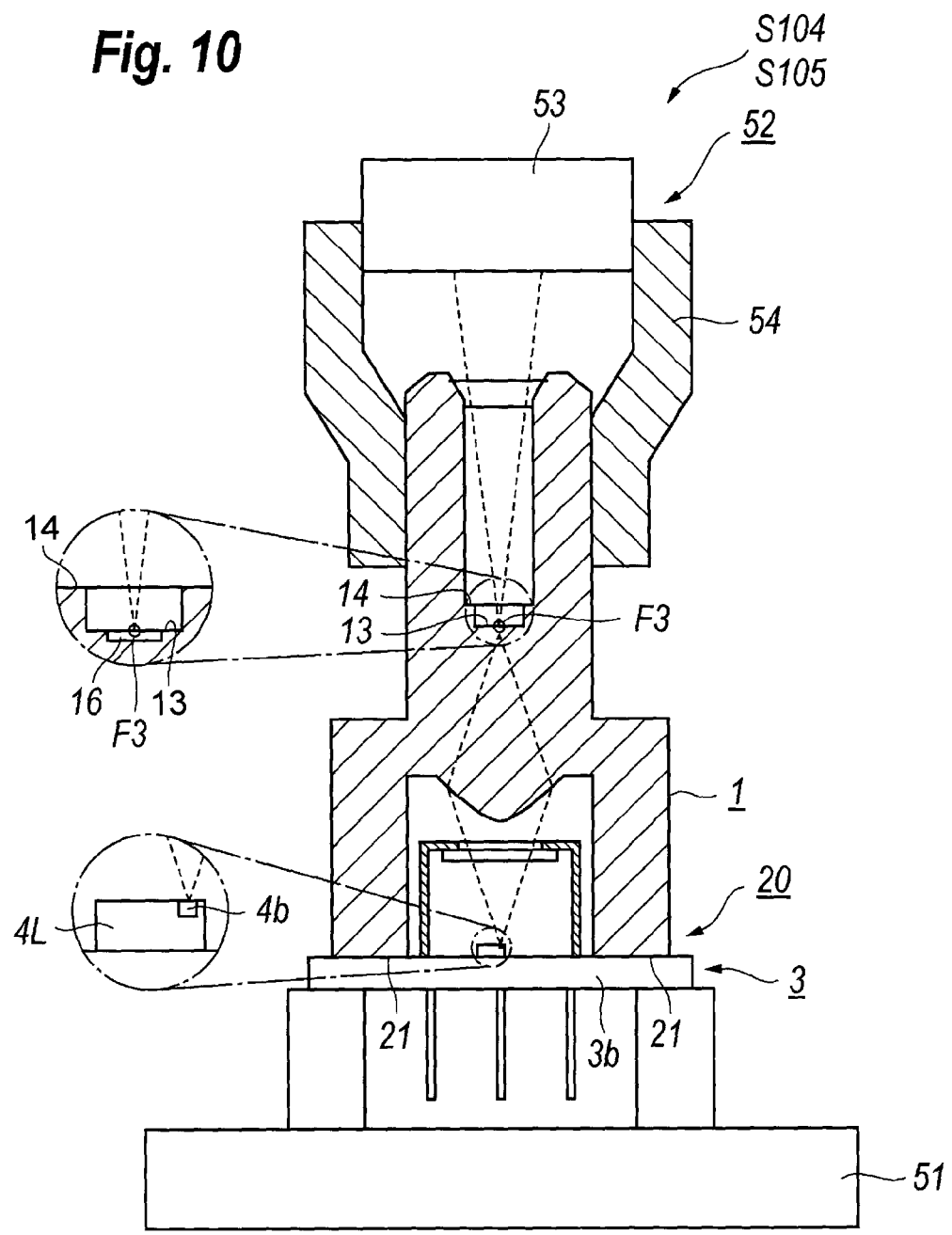
FIG. 10 shows a process, subsequent to the process shown in FIG. 9, to fix the holder with the optical device.

Next, a method to produce the optical assembly 90 implementing with the holder 1 will be described as referring to FIGS. 7 to 10. FIG. 7 shows a flow chart to manufacture the optical assembly 90; while, FIGS. 8 to 10 show processes to form the optical assembly 90. The method to manufacture the optical assembly 90 inspects misalignment of the active area 4b of the VCSEL 4L with respect to the optical axis L by viewing the target surface 13 from the opening 12 of the sleeve 10; then, the holder 1 may be aligned with respect to the optical device 3 to set the misalignment above within a preset range, and fixed thereto. FIGS. 8 to 10 accompany therewith the Cartesian coordinates whose Z-axis is in parallel to the optical axis L of the lens 30.

Referring to FIG. 8, step S100 prepares the holder 1; and step S101 fixes the optical device 3 on the XY stage 51 of the alignment apparatus. The XY stage may slide the optical device 3 along the X or Y directions in a plane parallel to the virtual plane 14a including the abutting step 14.

Step S102, which may be called as the Z-alignment, assembles a tool 52 with the holder 1. The tool 52 may provide an image device 53, typically a camera, and a chuck 54. The tool 52 is an equipment to couple the image device 53 with the holder 1. The image device 53 may inspect an image of the active area 4b projected on the target surface 13. The image device 53 preferably implements therewith a lens having a smaller F-number, which is one of indices of a lens determined by the focal length divided by the effective aperture NA, and a shallow depth of focus. The chuck 54 may assemble the image device 53 with the holder 1 by inserting the holder 1 therein. The chuck 54 has a length such that the focus F3 of the image device 53 may overlap the target surface 13 when the chuck 54 supports the holder in a preset position.

Although the embodiment shown in FIG. 8 assembles the image device 53 with the chuck 54, these members may be independently prepared. An arrangement where the image device 53 may inspect the target surface 13 of the holder 1 is the only one condition required in the image device 53 and the chuck 54, specifically, a condition where the focus of the image device 53 is set on the virtual plane including the target surface 13.

Referring to FIG. 9, step S103 optically aligns the VCSEL 4L along Z-direction. In this process, the image device 53 first inspects the target surface 13. Because the focus F3 of the image device 53 is set on the virtual plane including the target surface 13, the aiming index 16 provided on the target surface 13 may be clearly distinguished in a center of the visual field. Then, the alignment along the Z-direction may be carried out by adjusting a relative distance between the holder 1 and the optical device 3 by forming the image of the active area 4b projected on the target surface 13 by sliding the tool 52 along the Z-direction. Thus, by projecting the active area 4b on the target surface 13, two images of the projected active area 4b and the aiming index 16 may be clearly distinguishable on the target surface 13, and the Z-alignment may be completed at a position where two images on the target surface 13 is clearly inspected by the image device 53.

The inspecting light used in step S103, where the inspecting light is emitted from the image device 53 and reflected by the target surface 13, is preferably monochromatic light with the wavelength of, for instance, 550 nm to facilitate the precise Z-alignment. Moreover, in order to adjust the optical coupling efficiency between the external optical fiber 2a and the VCSEL 4L within a preset range, or to enhance the positional tolerance of the external optical fiber 2a to the optical device 3, further Z-alignment to offset the holder 1 from the optical device 3 along the Z-direction may be carried out after the aiming index 16 and the projected image of the active area 4b are clearly distinguished by the image device 53.

Figure 11:
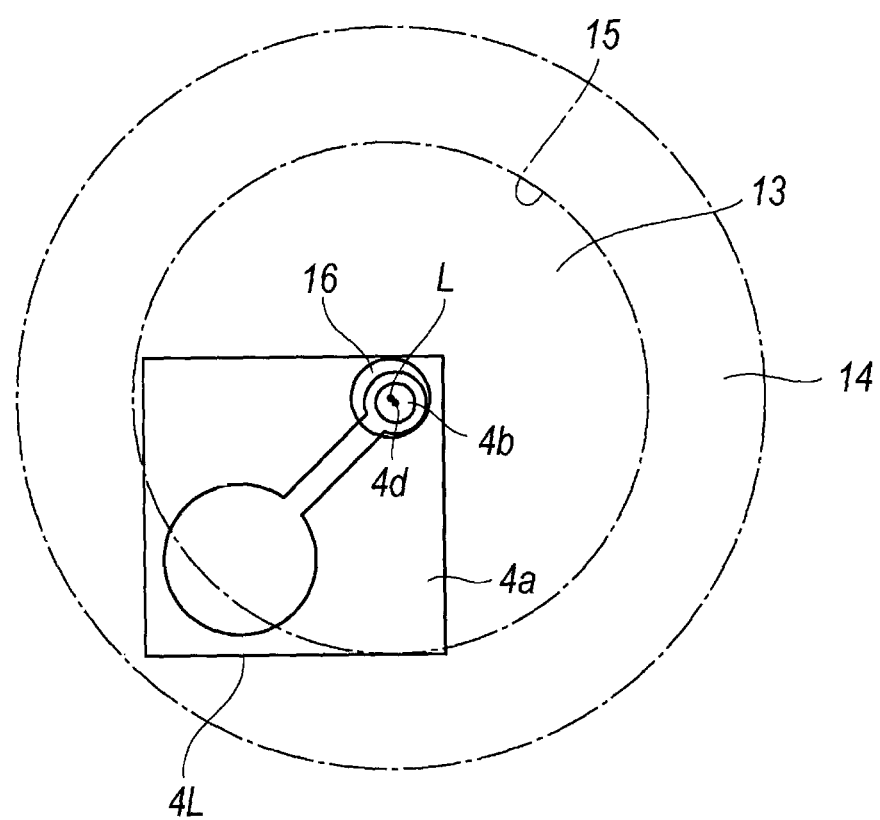
FIG. 11 schematically illustrates the images inspected by the image device applied in the process shown in FIGS. 9 and 10.

Referring to FIG. 10, step S104 may align the VCSEL 4L in a plane parallel to the target surface 13, namely, the XY-plane. FIG. 11 schematically illustrates the images inspected by the image device 53. When the center 4d of the active area 4b is offset from the optical axis L of the lens, which is indirectly distinguished by the aiming index 16, in the inspected images by the image device 53, the process to bring the center 4d of the projected image close to the axis L may be carried out by adjusting the XY-stage 51. Even when the center 4d of the image of the active area 4b is offset from the axis L distinguished by the aiming index 16, the XY-stage 51 may easily bring the center 4d in a position substantially aligned with the axis L. Thus, the XY-alignment between the holder 1 and the optical device 3 may be completed where the center 4d of the projected image of the active area 4b substantially coincides with the axis L.

Referring to FIG. 10 again, step S105 fixes the bottom of the skirt 20 of the holder with the base 3b of the optical device 3. Then, the optical assembly 90 showing excellent coupling efficiency between the semiconductor optical device 4L and the external optical fiber 2a may be obtained.

The holder 1 according to an embodiment of the invention includes the sleeve 10 with the opening 11. Inserting the ferrule 2b securing a tip end of the external finer 2a into the bore 11, the holder 1 may couple with the external optical fiber 2a. The holder 1 may further provide the skirt 20 fixed to the optical device 3; accordingly, the semiconductor optical device 4L installed within the optical device 3 may be coupled with the external optical fiber 2a via the holder 1. The lens 30 formed between the sleeve 10 and the skirt 30 may enhance the optical coupling efficiency between the semiconductor optical device 4L and the external optical fiber 2a.

Moreover, the sleeve 10 provides the target surface 13 with the aiming index 16 that is able to indicate the axis L of the lens 30. Accordingly, the XY-alignment of the semiconductor optical device 4L may be carried out as visually inspecting two images of the projected active area 4b of the device 4L and the optical axis L, and bringing the projected image of the active area 4b close to the axis L. Thus, according to the optical assembly 90 providing the holder 1 of the embodiment, the optical alignment of the semiconductor optical device 4L with the external optical fiber 2a may be carried out easily and in a short time without practically activating the semiconductor optical device 4L.

According to an embodiment of the present invention, the sleeve 10 provides the abutting step 14 between the opening 12 and the target surface 13, which may precisely determine the end position of the external optical fiber 2a. The abutting step 14 accompanies therewith the second bore 15 whose bottom coincides with the target surface 13 and the diameter thereof is set to be greater than the diameter of the external optical fiber 2a, which enables that the position of the tip end of the external optical fiber 2a may be automatically and precisely determined by abutting the ferrule 2b against the abutting step 14 and enables the tip end of the fiber 2a to be effectively protected from breakage.

The lens 30 may be characterized in that it provides the focal point F1 for the light with the preset wavelength on the virtual plane 14a including the abutting surface 14. The tip end of the external optical fiber 2a may be positioned on this virtual plane 14a by abutting the ferrule 2b against the abutting step 14. This arrangement enables light emitted from the semiconductor optical device 4L to be effectively concentrated in the external optical fiber 2a. The focal point F1 may be offset from the virtual plane along the optical axis L, which may not only adjust the optical coupling efficiency between the semiconductor optical device 4L and the external optical fiber 2a but also increase the alignment tolerance between the external optical fiber 2a and the optical axis L in the XY-plane.

The embodiment of the optical assembly 90 provides the reference edge 16a of the aiming index 16, which clearly defines the outer range of the area where the projected image of the active area 4b should be involved and facilitates the alignment to bring the center of the projected image of the active area 4b close to the optical axis L of the lens 30. Moreover, the reference edge 16a is formed outside the inner contour 17a of the projected image of the active area 4b, which may prevent light emitted from the semiconductor optical device 4L from being scattered by the reference edge 16a. Still further, the reference edge 16a is formed inside the outer contour 17b surrounding an area four times wider than the area surrounded by the inner contour 17a; that is, the reference edge 16a may be formed in a position relatively close to the optical axis L to determine the position of the axis L precisely and detect the offset or the misalignment of the projected image of the active area 4b with respect to the optical axis L precisely.

The lens 30 has another focal point F2 for the light with the inspecting wavelength. The other focal point F2 is on the target surface 13, which may project the active area 4b on the target surface 13.

Figure 12:
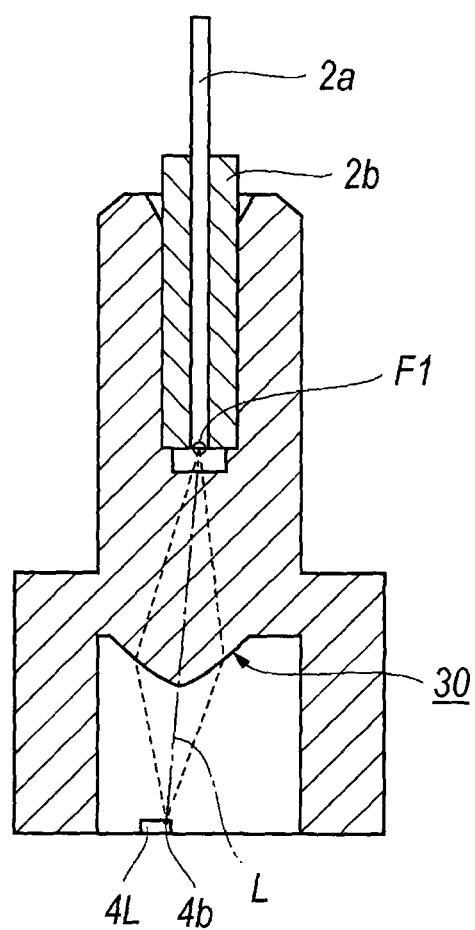
FIG. 12 shows a cross section of a modified holder where the axis of the lens is offset from the axis of the sleeve to enter the light from the semiconductor optical device in the tip of the external optical fiber in an inclined angle.

The embodiments above described concentrate on a condition where the axis L exists in the center of the lens 30. However, the optical axis L is unnecessary to coincide with the center of the lens 30. For instance, when the active area 4b is offset from the center of the lens 30 as shown in FIG. 12, the optical axis L becomes inclined to the center axis of the lens 30. Even in such an arrangement, the lens 30 may be designed to set the focal point F1 for the image of the active area 4b on the end facet of the external optical fiber 2a, or on the center of the ferrule 2b. The light emitted from the semiconductor optical device 4L enters the end facet of the external optical fiber 2a with a substantial angle with respect to the axis of the external optical fiber 2a, but light reflected by the end facet of the external optical fiber 2a may be prevented from returning the semiconductor optical device 4L, which may operate the device 4L in further stable.

Figure 13A:
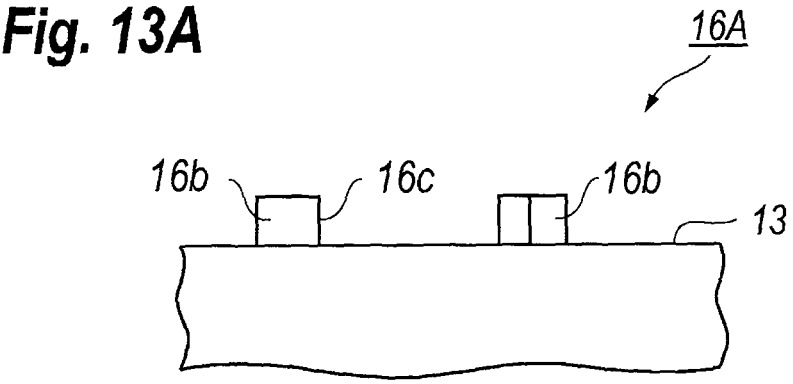
FIG. 13A is a side view of a modified aiming index on the target surface.
Figure 13B:
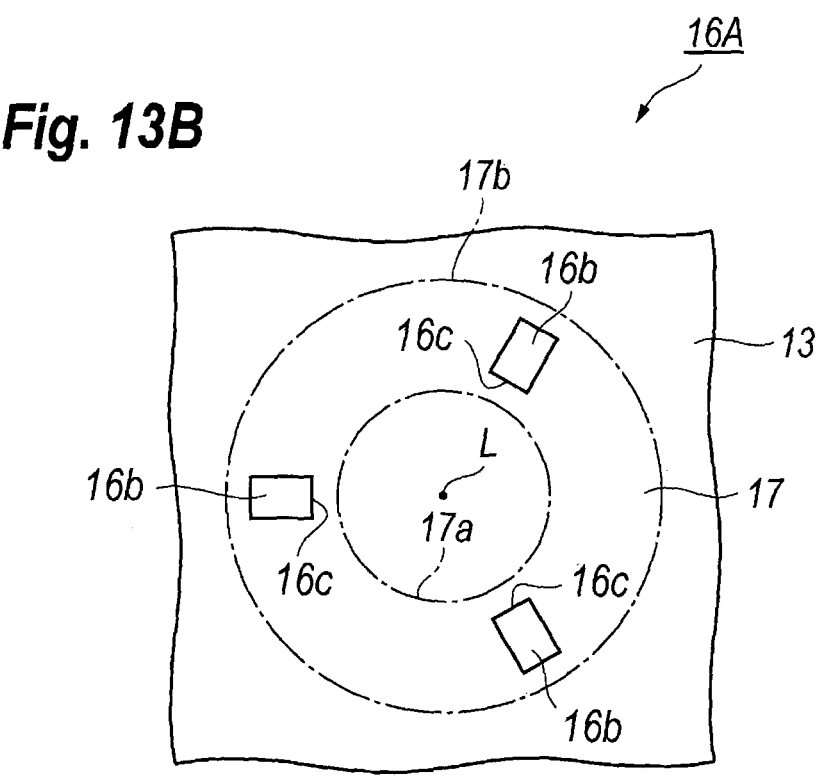
FIG. 13B is a plan view thereof.

Although the present invention has been fully described in conjunction with the preferred embodiment thereof with reference to the accompanying drawings, it is to be understood that various changes and modifications may be apparent to those skilled in the art. For instance, the aiming index 16 may have various shapes as long as the position of the axis L is easily indicated. FIGS. 13A and 13B show modified aiming index 16A, where FIG. 13A is a side view, while, FIG. 13B is a plan view of the modified aiming index 16A. Referring to FIGS. 13A and 13B, the aiming index 16A includes a plurality of projections 16b each extending radially from the position of the axis L and having respective reference edges 16c showing the function same as the reference edge 16a of the embodiment above described. The edges 16c are preferably formed between the outer and inner contours, 17a and 17b. Moreover, the number of projections 16b is not restricted to the arrangement of FIG. 13B. More than two (2) projections making an angle to recognize their intersection easily may be applicable as the aiming index 16A.

Figure 14A:
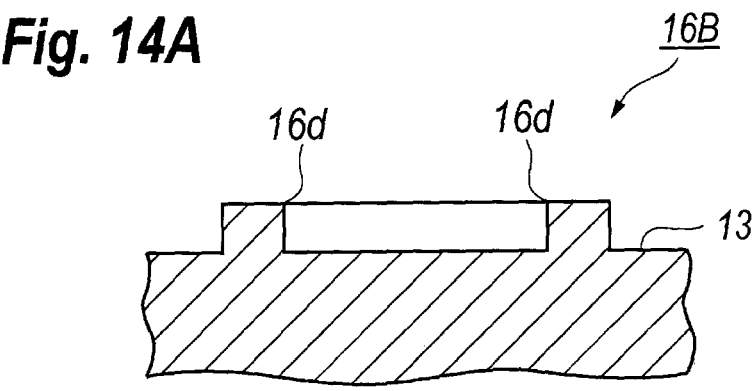
FIG. 14A is a side view of still modified aiming index on the target surface.
Figure 14B:
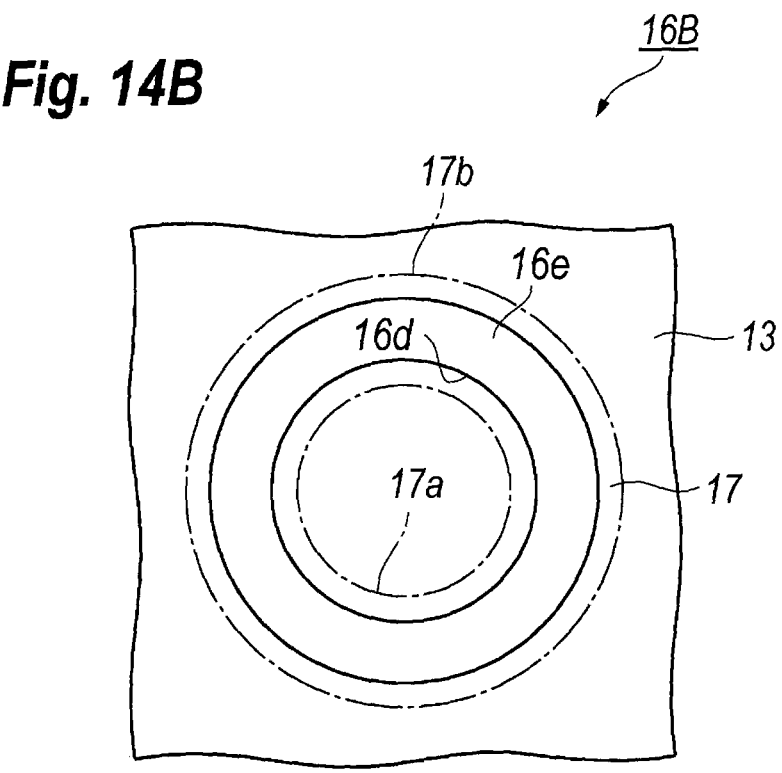
FIG. 14B is a side view thereof.
Figure 15:
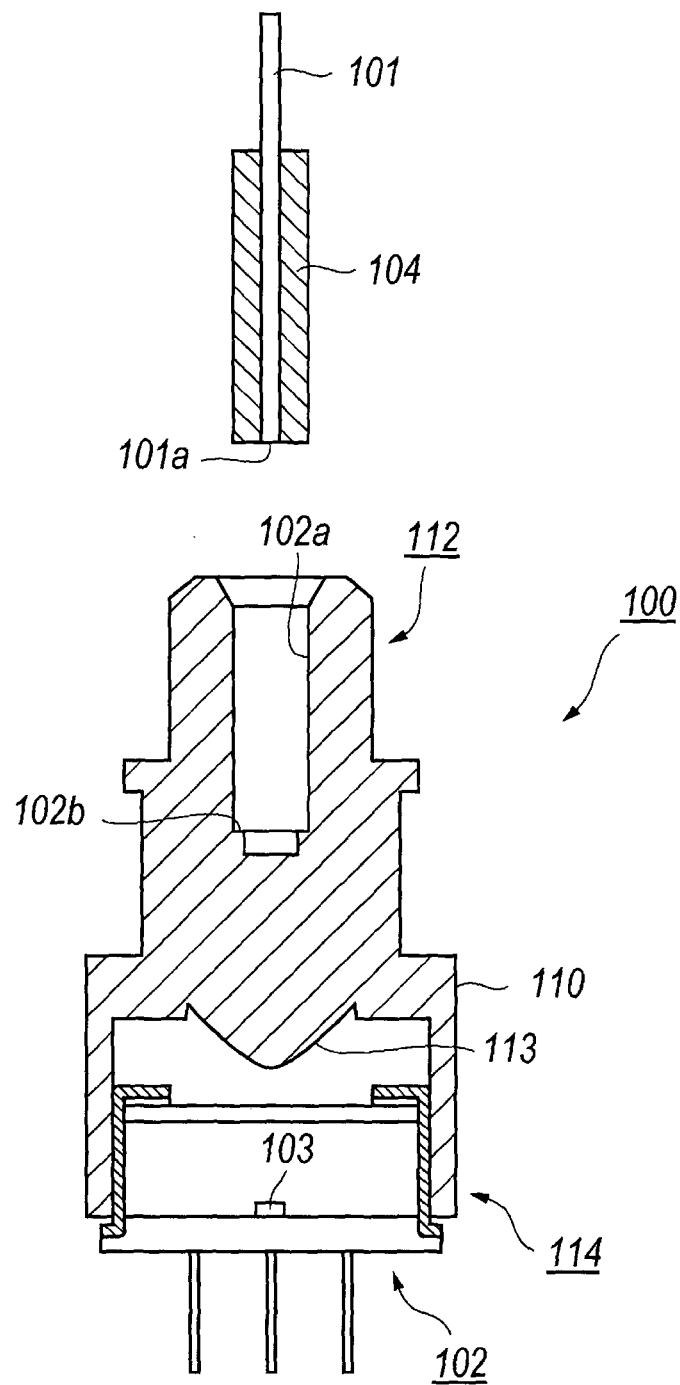
FIG. 15 shows a cross section of an optical assembly with a conventional holder without any aiming index on the target surface.

FIGS. 14A and 14B show still further modified arrangement of the aiming index 16B. The aiming index 16B has a ribbed ring 16e in a plan view thereof. The inner wall 16d of the ring 16e shows the function same as the reference edge 16a of the former embodiment. The inner wall 16d is also preferably formed in the aiming area 17 between the inner and upper contours, 17a and 17b.

Moreover, embodiments above described provide the aiming index 16 formed in the target surface 13. However, the edge 15a of the second bore 15 appeared in the abutting surface 14 may be used as the index to indicate the position of the optical axis L. The abutting surface 14 is apart by the depth of the second bore 15 from the target surface 13 along the Z-direction, which makes the image obtained by the image device 53 indistinct. However, some picture processing carried out on the edge 15a may clear the contour to identify the optical axis L. Then, the alignment of the projected image of the active area 4b of the device 4L with the axis L may be carried out. Therefore, it is intended that the present invention not be limited to the particular embodiments disclosed, but that the invention include all embodiments falling within the scope of the appended claims.

The invention claimed is:

1. An optical assembly optically coupled with an external optical fiber, comprising:
   an optical device that installs a semiconductor optical device therein, the semiconductor optical device including an active area; and
   a holder including a sleeve with a first bore configured to receive the external optical fiber therein, a skirt configured to be fixed with the optical device, and a lens put between the sleeve and the skirt,
   wherein the first bore provides a target surface in an end thereof, the target surface including an aiming index to indicate an axis of the lens, and
   wherein for visible light having an inspecting wavelength, the lens focuses an image of the active area of the semiconductor optical device on a virtual plane including the target surface.

2. The optical assembly of claim 1,
   wherein the first bore further provides a step between the target surface and an opening of the first bore through which the external optical fiber is inserted, the step abutting against a ferrule that secures a tip end of the external optical fiber.

3. The optical assembly of claim 2,
   wherein the sleeve includes a second bore configured to form the step in a boundary to the first bore, the second bore including the target surface in a bottom thereof.

4. The optical assembly of claim 3,
   wherein the first bore has a diameter greater than a diameter of the second bore.

5. The optical assembly of claim 3,
   wherein the second bore has a diameter greater than a diameter of the external optical fiber.

6. The optical assembly of claim 1,
   wherein the virtual plane is offset from the target surface along the axis of the lens at a wavelength attributed to the semiconductor optical device.

7. The optical assembly of claim 1,
   wherein the target surface provides at least two aiming indices each having a reference edge surrounding an image of the active area projected on the target surface.

8. The optical assembly of claim 1,
   wherein the target surface provides at least two aiming indices each having a reference edge located between an inner contour of an image of the active area projected on the virtual plane and an outer contour of a virtual image four times broader than the image of the active area projected on the virtual plane.

9. The optical assembly of claim 1,
   wherein the inspecting wavelength is shorter than 600 nm.

10. The optical assembly of claim 1,
    wherein the holder integrally forms the sleeve, the lens and the skirt, and is made of at least one of polyetherimide (PEI), polycarbonate (PC), and polymethyl methacrylate (PMMA).

11. A process for manufacturing an optical assembly including an optical device that installs a semiconductor optical device with an active area and a holder having a sleeve configured to receive an external optical fiber, a skirt configured to receive the optical device, and a lens put between the sleeve and the skirt, the sleeve, the skirt and the lens being integrally formed with each other, the process comprising steps of:
    aligning the optical device in a plane perpendicular to an axis of the lens by focusing, for visible light, an image of the active area of the optical device by the lens on a virtual surface including a target surface formed in a deep end of the sleeve; and
    fixing the optical device with the skirt of the holder.

12. The process of claim 11,
    wherein the target surface includes aiming indices to indicate the axis of the lens, and
    wherein the step of aligning the optical device includes a step of aligning a center of the image of the active area focused on the target surface by the lens with the axis of the lens indicated by the aiming indices.

13. The process of claim 12,
    wherein the sleeve provides a step positioned between the target surface and an opening through which the external optical fiber is set, the step abutting against a ferrule for securing a tip end of the external optical fiber set in the sleeve,
    wherein the step for aligning the optical device further includes a step of focusing an image of the active area of the optical device by the lens on a virtual surface including the step for a wavelength attributed to the semiconductor optical device.

14. The process of claim 12,
    wherein the sleeve provides a step positioned between the target surface and an opening through which the external optical fiber is set, the step abutting against a ferrule for securing a tip end of the external optical fiber set in the sleeve, wherein the step for aligning the optical device further includes a step of focusing an image of the active area of the optical device by the lens on a virtual surface offset from the step for a wavelength attributed to the semiconductor optical device.

15. The process of claim 11, wherein the step of aligning the optical device further includes a step of de-focusing the image of the active area of the optical device along the optical axis.

* * * * *